United States Patent [19]

Saiki et al.

[11] Patent Number: 4,619,987

[45] Date of Patent: Oct. 28, 1986

[54] PROCESS FOR PREPARATION OF HIGH-MOLECULAR WEIGHT POLYESTER

[75] Inventors: Noritsugu Saiki; Tadashi Konishi, both of Matsuyama, Japan

[73] Assignee: Teijin Limited, Osaka, Japan

[21] Appl. No.: 785,478

[22] Filed: Oct. 8, 1985

[30] Foreign Application Priority Data

Oct. 12, 1984 [JP] Japan .............................. 59-212588
Oct. 19, 1984 [JP] Japan .............................. 59-218664
Oct. 26, 1984 [JP] Japan .............................. 59-224207

[51] Int. Cl.$^4$ ...................... C08G 63/04; C08G 63/22
[52] U.S. Cl. ...................... 528/274; 525/437; 525/441; 525/445; 525/450; 528/279; 528/283; 528/302
[58] Field of Search ............... 525/437, 441, 445, 450; 528/274, 279, 283, 302

[56] References Cited

U.S. PATENT DOCUMENTS

| | | |
|---|---|---|
| 4,143,094 | 3/1979 | Burzin et al. .................. 528/274 X |
| 4,379,912 | 4/1983 | Lu ................................ 528/274 |
| 4,454,313 | 6/1984 | Okitsu et al. ................. 528/302 |
| 4,532,319 | 7/1985 | Wendling ..................... 528/274 |

Primary Examiner—Lucille M. Phynes
Attorney, Agent, or Firm—Burgess, Ryan & Wayne

[57] ABSTRACT

A process for preparing a high-molecular weight polyester comprising additionally polymerizing a polyester obtained from a dicarboxylic acid component composed mainly of an aromatic dicarboxylic acid and/or an ester-forming derivative thereof and a glycol component composed mainly of ethylene glycol and/or an ester-forming derivative thereof and having an intrinsic viscosity of at least 0.8, at a temperature above the melting point of the polyester and under a reduced pressure, in the presence of a compound (A) successively generating a substance which is gaseous under the polymerization conditions and does not substantially reduce the molecular weight of the polyester, to form a polyester having an intrinsic viscosity of at least 1.0.

17 Claims, 2 Drawing Figures

PROCESS FOR PREPARATION OF HIGH-MOLECULAR WEIGHT POLYESTER

BACKGROUND OF THE INVENTION (1) Field of the Invention

The present invention relates to a process for the preparation of a high-molecular weight polyester which is valuable as a starting material of fibers, films and other shaped articles having excellent physical properties. More particularly, the present invention relates to a process for preparing a high-molecular weight polyester having an intrinsic viscosity of at least 1.0 by melt polymerization.

(2) Description of the Related Art

It is known that polyesters represented by polyethylene terephthalate can be used as the starting materials for the production of fibers, films and other shaped articles.

The molecular weight is an important factor having influences on the strength and other physical properties of these shaped articles, and increase of the molecular weight has been desired for improving these physical properties.

However, it has been considered difficult to obtain high-molecular weight polyesters according to the ordinary melt polymerization including the glycol-removing polycondensation customarily adopted, because (1) the glycol-removing polycondensation is an equilibrium reaction and hence, the molecular weight cannot be elevated beyond a level corresponding to the partial pressure of the glycol and (2) since the polycondensation reaction is carried out at a high temperature, also a decomposition reaction is caused.

As means for solving these problems, there is ordinarily adopted a solid phase polymerization method in which the polymerization reaction is carried out at a low temperature. However, the solid phase polymerization method is defective in that a long time is required for completion of the reaction and the obtained polymer is hardly soluble. Moreover, the intrinsic viscosity of the polymer obtained according to the solid phase polymerization method is about 1.4 at highest.

Various trials have been made to improve the melt polymerization method for obtaining high-molecular weight polyesters. As a typical instance, there can be mentioned a method using a chain extender. However, this method is disadvantageous in that an expensive chain extender should be used, portions connected through the chain extender are thermally unstable, a compound formed as a by-product from the chain extender is left in the polymer or incorporated in ethylene glycol formed as a by-product and recovery of ethylene glycol is rendered difficult. Furthermore, even if this method is adopted, it is difficult to obtain a high-molecular weight polyester having an intrinsic viscosity of at least 1.8.

SUMMARY OF THE INVENTION

It is an object of the present invention to provide a process for preparing a high-molecular weight polyester, that cannot be provided according to the conventional techniques, by the melt polymerization method.

We made research on the melt polymerization reaction of a polyester in a high-molecular-weight region where the intrinsic viscosity is at least 0.8, and as the result, it was found that the polymerization degree of the polyester approaches the polymerization degree in the equilibrium state with the lapse of the reaction time at a temperature where the decomposition reaction can be neglected and this speed is expressed by the following formula:

$$\frac{d(1/p)}{dt} = -k(1/p - 1/p_\infty) \quad (1)$$

wherein p stands for the polymerization degree at the reaction time t and $p_\infty$ stands for the polymerization degree in the equilibrium state, and that $1/p_\infty^2$ is proportional to the depth of the liquid. This means that the polymerization degree that can be attained is changed according to the liquid pressure. Accordingly, we noted that if the effect of the liquid pressure is reduced, the attainable polymerization degree can be increased. More specifically, it was noted that supposing that the liquid pressure is equal to the pressure of reaction by-products such as the glycol in ordinary polymerization of polyesters, the square of the terminal group concentration (which is the amount proportional to $1/p_\infty$) is proportional to the liquid depth in the following equilibrium reaction:

$$2\sim\underset{\underset{O}{\|}}{C}O(CH_2)nOH \rightleftarrows \sim\underset{\underset{O}{\|}}{C}O(CH_2)nO\underset{\underset{O}{\|}}{C}\sim + HO(CH_2)nOH \quad (2)$$

We furthered our research on this point and came to consider that if the liquid pressure is made different from the pressure of the reaction by-products (the glycol and the like), that is, if the sum of partial pressures of other gases and reaction by-products is made equal to the liquid pressure, the equilibrium of the formula (2) shifts to the right and a polyester having a high molecular weight can be obtained.

From this consideration, we concluded that if a substance capable of successively generating a gas is made present during the reaction, a polyester having a high molecular weight can be inevitably obtained. Accordingly, we tried to reduce the partial pressure of reaction by-products by utilizing a known reaction of forming a cyclic ester from a polyester of a long-chain aliphatic dicarboxylic acid with a glycol, and as the result, it was confirmed that a polyester having a high molecular weight, that cannot be obtained by the conventional techniques, can be obtained. Thus, we have now completed the present invention.

In accordance with the present invention, there is provided a process for preparing a high-molecular weight polyester comprising polymerizing a polyester obtained from a dicarboxylic acid component composed mainly of an aromatic dicarboxylic acid and/or an ester-forming derivative thereof and a glycol component composed mainly of ethylene glycol and/or an ester-forming derivative thereof and having an intrinsic viscosity of at least 0.8, at a temperature above the melting point of the polyester and under a reduced pressure, in the presence of a compound (A) successively generating a substance which is gaseous under the polymerization conditions and does not substantially reduce the molecular weight of the polyester, to form a polyester having an intrinsic viscosity of at least 1.0.

Figure 1:
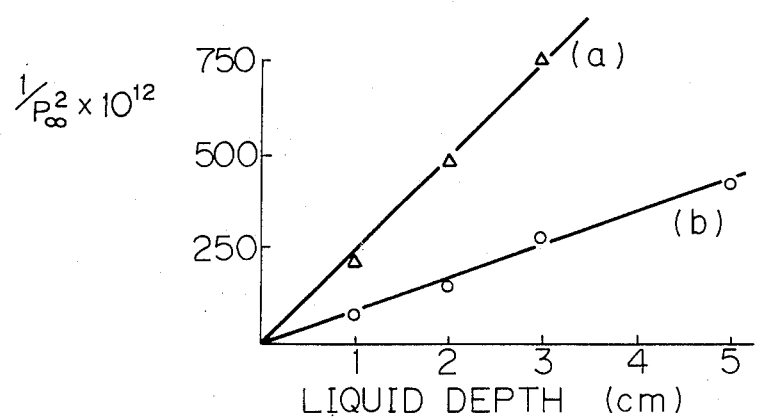
FIG. 1 shows the relation between $(1/p_\infty^2 \times 10^2)$ and the liquid depth and FIG. 2 shows the relation between $(1/p - 1/p_\infty) \times 10^6$ and the reaction time (hours), in which p stands for the polymerization degree at the polymerization time t and $p_\infty$ stands for the polymerization degree in the equilibrium state.

In the drawings, line (a) show the results obtained when isophthalic acid is copolymerized, line (b) shows the results obtained when $\alpha,\omega$-decane-dicarboxylic acid is copolymerized, line (c) shows the results obtained when isophthalic acid is copolymerized and the liquid depth is 3 cm, line (d) shows the results obtained when isophthalic acid is copolymerized and the liquid depth is 1 cm, line (e) shows the results obtained when $\alpha,\omega$-decane-dicarboxylic acid is copolymerized and the liquid depth is 3 cm, and line (f) shows the results obtained when $\alpha,\omega$-decane-dicarboxlic acid is copolymerized and the liquid depth is 1 cm.

DESCRIPTION OF THE PREFERRED EMBODIMENTS

The polyester intended in the present invention comprises an aromatic dicarboxylic acid as the main dicarboxylic acid component and ethylene glycol as the main glycol component. By the term "composed mainly of" used herein, it is meant that the dicarboxylic acid or glycol comprises at least 50 mole % of an aromatic dicarboxylic acid or ethylene glycol. Accordingly, other dicarboxylic acid or glycol may be contained in an amount of up to 50 mole %.

As the aromatic dicarboxylic acid used in the present invention, there can be mentioned compounds in which carboxylic acid groups are directly bonded to the aromatic nucleus, such as terephthalic acid, isophthalic acid, naphthalene-dicarboxylic acid, diphenyldicarboxylic acid and diphenyletherdicarboxylic acid. Terephthalic acid is especially preferred.

As the third component to be copolymerized in the present invention, there can be mentioned aromatic dicarboxylic acids other than the main constituent of the polyester, aliphatic dicarboxylic acids such as oxalic acid, malonic acid, succinic acid, adipic acid, sebacic acid and decane-dicarboxylic acid, alicyclic dicarboxylic acids such as hexahydrophthalic acid, decalin-dicarboxylic acid and tetralin-dicarboxylic acid, glycolic acid, p-hydroxybenzoic acid, aliphatic glycols other than the main constituent of the polyester, such as trimethylene glycol, propylene glycol, 1,4-butanediol, 1,3-butanediol, neopentyl glycol and 1,6-hexanediol, alicyclic diols such as cyclohexane dimethylol and tricyclodecane dimethylol, and aromatic diols such as bisphenol A, bisphenol S, bishydroxyethoxybisphenol A and tetrabromobisphenol A.

By the ester-forming derivative, there are meant compounds capable of forming an ester group on reaction with the dicarboxylic acid or glycol, such as alkyl esters and aryl esters of acids or esters of diols.

When a high-molecular weight polyester having an intrinsic viscosity of at least 1.0 is formed from the aromatic dicarboxylic acid and/or its ester-forming derivative and ethylene glycol and/or its ester-forming derivative, optionally with a comonomer as described above, according to the present invention, a compound (A) as described hereinafter is made present in the stage where the intrinsic viscosity is at least 0.8. The compound (A) is a compound capable of successively generating a substance which is gaseous under the polymerization conditions (temperature and pressure conditions) for further increasing the molecular weight of a polymer having an intrinsic viscosity of about 0.8 and does not substantially reduce the molecular weight of the polyester. It is preferred that the compound (A) be a substance not reducing the molecular weight of the polyester, but even if the compound (A) temporarily reduces the molecular weight after the addition, this compound can be used if it shows the effect of the present invention afterwards.

The compound (A) having the above-mentioned properties may be copolymerized in the polyester or blended in the polyester. As a specific example, there can be mentioned a polyester obtained from an aliphatic dicarboxylic acid having 6 to 20 carbon atoms and an aliphatic diol such as ethylene glycol. This aliphatic polyester generates a cyclic ester which becomes gaseous under the polymerization conditions and makes contributions to the increase of the molecular weight. This aliphatic polyester separately synthesized may be added, the aliphatic dicarboxylic acid and aliphatic diol or an oligomer obtained therefrom may be added to the starting material for the subject polyester, or the aliphatic polyester may be contained as the copolymerization component in the intended polyester. In the latter case, in order to prevent lowering of the melting point, it is preferred the aliphatic polyester having the same glycol component as that of the intended polyester be used. When the compound (A) of the copolymerization type is used, there can be adopted a method in which the compound (A) is made present from the start of the polymerization reaction.

As the aliphatic dicarboxylic acid, there can be mentioned adipic acid, pimelic acid, suberic acid, azelaic acid, sebacic acid, $\alpha,\omega$-nonane-dicarboxylic acid, $\alpha,\omega$-decane-dicarboxylic acid and brassylic acid. Aliphatic dicarboxylic acids having 8 to 12 carbon atoms, such as suberic acid, azelaic acid, sebacic acid and $\alpha,\omega$-decane-dicarboxylic acid, are preferred.

As other specific examples, there can be mentioned polymers of aliphatic hydroxycarboxylic acids having 5 to 12 carbon atoms, such as polycaprolactone, and polymers gradually decomposable under the polymerization temperature condition adopted in the present invention, such as polystyrene, polyoxymethylene or the like. The hydroxycarboxylic acid may be added in the form of a polymer or used as one comonomer of the polyester of the present invention.

The amount added of the compound (A) capable of successively generating a substance which is gaseous under the polymerization conditions and does not substantially reduce the molecular weight of the polyester may be 2 to 20 mol % as the aliphatic dicarboxylic acid units or aliphatic hydroxycarboxylic acid units. In the case of polystyrene or polyhydroxymethyl, the amount may be 2 to 20% by weight. If the compound (A) is added in too large an amount, the effect may not be enhanced but the physical properties of the intended polyester may be changed. If the amount of the compound (A) is too small, the effect is low.

In the present invention, the polymerization may be carried out according to customary polycondensation procedures. More specifically, the dicarboxylic acid and/or its ester-forming reactive and the aliphatic diol and/or its ester-forming derivative are subjected to so-called esterification or ester-exchange reaction in the presence or absence of a catalyst under atmospheric or elevated pressure and then, the polymerization is carried out in the presence of a catalyst under a reduced pressure to increase the polymerization degree.

In this polymerization process, it is preferred that the polymerization reaction be carried out at a temperature as low as possible, for example at 240° to 270° C. At too high a temperature, a side reaction other than the ester group-exchange reaction is caused to occur and the molecular weight is reduced. A higher degree of reduction of the pressure is preferred. Namely, it is preferred that the pressure be lower than 200 Pa, especially lower than 100 Pa. The reaction time is changed according to the catalyst, the reaction apparatus and the like, but the reaction time is ordinarily 10 minutes to 20 hours.

Any of catalysts ordinarily used for the polymerization of polyesters can be optionally used, and a titanium compound and a tin compound are preferably used.

As the titanium compound that can be used in the present invention, there can be mentioned, for example, compounds represented by the following general formulae:

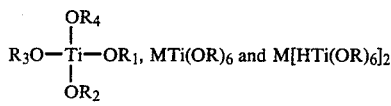

wherein R, $R_1$, $R_2$, $R_3$ and $R_4$ stand for an alkyl group, an aryl group or a hydrogen atom, and M stands for an alkaline earth metal, such as tetrabutyl titanate, tetraisopropyl titanate, tetra(2-ethylhexyl) titanate, tetrastearyl titanate, diisopropoxybis(acetylacetonato)titanium, di-n-butoxybis(triethanolaminato)titanium, dihydroxybis(lactato)titanium, titanium isopropoxyoctyleneglycolate, isopropoxytitanium triisostearate, tetrabenzoyl titanate, titanium methylate magnesium, titanium butylate magnesium, titanium octylate magnesium, titanium butylate calcium and titanium ethylate strontium, and hydrolysis products (partial hydrolysis products being included), ester-exchange reaction products and hydrolysis/ester-exchange reaction products thereof, and compounds represented by the following formulae:

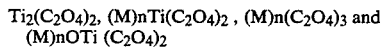

wherein M stands for a metal atom, H or $MH_4$, and n is 1 when M is a divalent metal or n is 2 when M is H, $NH_4$ or a monovalent metal, such as titanium oxalate, potassium dioxalatotitanate(III), ammonium dioxalatotitanate(III), hydrogen oxodioxalatotitanate(IV), sodium oxodioxalatotitanate(IV), barium oxodioxazalatotitanate(IV) and calcium trioxalatotitanate(IV), and hydrates thereof. Among these titanium compounds, tetrabutyl titanate and tetraisopropyl titanate are preferred.

As the tin compound that can be used in the present invention, there can be mentioned, for example, compounds represented by the following general formulae:

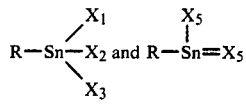

wherein R stands for an alkyl group or an aryl group, $X_1$ through $X_4$ stand for a monovalent group such as an alkyl group, an aryl group, an acyloxy group, a cyclohexyl group, a hydroxyl group or a halogen atom, and $X_5$ stands for a sulfur or oxygen atom, such as methylphenyltin oxide, tetraethyltin, dibutyltin oxide, didodecyltin oxide, triethyltin hydroxide, triphenyltin hydroxide, triisobutyltin acetate, dibutyltin diacetate, diphenyltin dilaurate, monobutyltin trichloride, dibutyltin dichloride, tributyltin chloride, dibutyltin sulfite and butylhydroxytin oxide. Among these tin compounds, dibutyltin oxide and butylhydroxytin oxide are preferred.

It is preferred that an apparatus capable of treating highly viscous products be used for carrying out the present invention. For example, a kneader having a space zone where the pressure can be reduced and an extruder (especially a biaxial extruder) having a space zone where the pressure can be reduced are preferably used. Of course, a simple stirring tank or a stationary reaction apparatus may be satisfactorily used, if there is no problem of the homogeneousness and a contrivance is made to the product-recovering method. As pointed out hereinbefore, increase of the polymerization degree is influenced by the depth of the liquid. Accordingly, it is preferred that the distance between the external space and the center of the polymer bulk be as small as possible, for example, less than 20 cm, especially less than 10 cm.

In the process of the present invention, the additional polymerization may further be carried out by using the polyester having an intrinsic viscosity of at least 0.8 in a granular state wherein the polymer granules are substantially covered by a powder material, or by placing the polyester having an intrinsic viscosity of at least 0.8 onto a plate to a thickness of 0.1 to 10 mm and then heating the polyester on the plate.

In the present invention, pigments, dyes, stabilizers, crystallizing agents, lubricants, parting agents, plasticizers and other modifiers may be added to the polyester according to need.

The present invention will now be described in detail with reference to the following examples.

EXAMPLE 1

87.4 g of dimethyl terephthalate, 11.5 g (10 mole %) of α,ω-decane-dicarboxylic acid and 90 g of ethylene glycol were heated together with 68 mg of titanium tetrabutoxide, and reaction was conducted until the amount of the distillate was increased to 41 ml. The reaction mixture was charged into a reaction vessel having a capacity of 300 ml and equipped with a distillation column and a stirrer, and reaction was carried out in a bath at 260° C. for 30 minutes in a nitrogen atmosphere to remove a distillate composed mainly of ethylene glycol by distillation. Then, the pressure was gradually reduced below 200 Pa over a period of 30 minutes and below 50 Pa over a period of 10 hours, and the polymerization degree-increasing reaction was continued while removing the distillate by distillation. The stirring speed was lowered with increase of the viscosity and was finally reduced to 0.5 rpm. After the reaction under reduced pressure was conducted, the formed polymer was withdrawn. The intrinsic viscosity of the polymer was 2.35 as measured at 35° C. in o-chlorophenol.

It was confirmed that distillation of the distillate was continued during the reaction under high vacuum, and by the gas chromatogram analysis, it was found that more than 50% of the distillate was a cyclic ester which was a condensate of α,ω-decane-dicarboxylic acid with ethylene glycol.

COMPARATIVE EXAMPLE 1

The reaction was carried out in the same manner as described in Example 1 except that 9.7 g (10 mole %) of isophthalic acid was used instead of α,ω-decane-dicarboxylic acid. The intrinsic viscosity of the polymer withdrawn after 10 hours' reaction was 1.72. After the passage of 4 hours from the point of the start of reduction of the pressure, formation of the distillate was not substantially observed.

EXAMPLE 2 AND COMPARATIVE EXAMPLE 2

Figure 2:
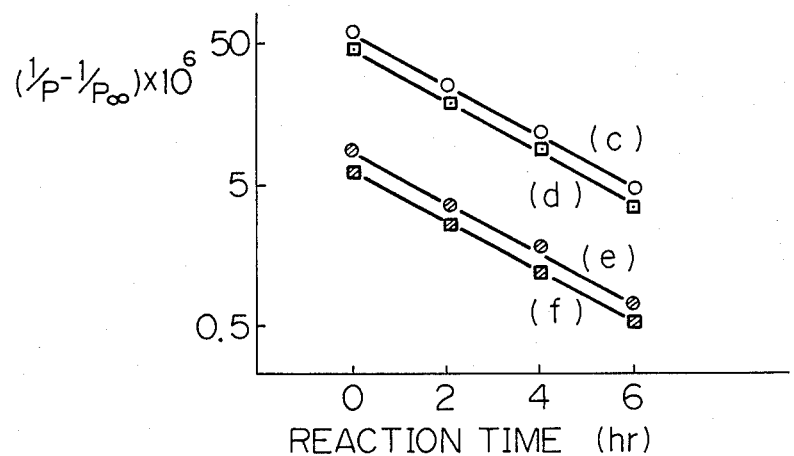

Polymers obtained when reaction was conducted for 2 hours after the start of reduction of the pressure in Example 1 and Comparative Example 1 were charged in the molten state in test tubes having a diameter of about 2 cm so that the liquid depth was 1, 2, 3 or 5 cm, and reaction was then carried out at 260° C. under a reduced pressure lower than 50 Pa without stirring. The polymerization degree (p) was calculated from the intrinsic viscosity at each reaction time and $p_\infty$ in the equilibrium state was supposed, and the relation between $\log(1/p - 1/p_\infty)$ and the reaction time and the relation between $(1/p_\infty)^2$ and the liquid depth were determined. The obtained results are shown in FIG. 2 and FIG. 1, respectively. From the results shown in FIG. 1, it is seen that the copolymerization of α,ω-decane-dicarboxylic acid is effective for moderating the effect of reducing the polymerization degree by the liquid depth in the equilibrium state.

EXAMPLES 3 THROUGH 5

Reduced pressure reaction was carried out for 10 hours in the same manner as described in Example 1 except that suberic acid, azelaic acid or sebacic acid was used instead of α,ω-decane-dicarboxylic acid in the same molar amount as in Example 1. The intrinsic viscosity was 1.89 when suberic acid was copolymerized, 1.98 when azelaic acid was copolymerized or 2.04 when sebacic acid was copolymerized. In each case, it was confirmed that the distillate was present to the last of the polymerization reaction, though the amount was small, and that the distillate contained a large amount of a cyclic ester.

EXAMPLES 6 THROUGH 8 AND COMPARATIVE EXAMPLES 3 THROUGH 5

Polymerization was carried out in the same manner as described in Example 1 except that the dicarboxylic acid component as changed as shown in Table 1 and the amount added of α,ω-decane-dicarboxylic acid was changed as shown in Table 1. The obtained results are shown in Table 1.

TABLE 1

| | Dicarboxylic Acid Component | Amount (mole %) of Copolymerized α, ω-Decanedicarboxylic Acid | Intrinsic Viscosity |
|---|---|---|---|
| Example 6 | dimethyl isophthalate | 10 | 2.10 |
| Comparative Example 3 | dimethyl isophthalate | 0 | 1.63 |
| Example 7 | equimolar mixture of dimethyl 2,6-naphthalene-dicarboxylate and dimethyl isophthalate | 20 | 1.98 |
| Comparative Example 4 | equimolar mixture of dimethyl 2,6-naphthalene-dicarboxylate and dimethyl isophthalate | 0 | 1.55 |
| Example 8 | 1/0.5 molar ratio mixture of dimethyl 4,4'-diphenyldicarboxylate/dimethyl isophthalate | 5 | 1.95 |
| Comparative Example 5 | 1/0.5 molar ratio mixture of dimethyl 4,4'-diphenyldicarboxylate/dimethyl isophthalate | 0 | 1.49 |

EXAMPLES 9 AND 10

Reaction was conducted for 2 hours in the same manner as described in Comparative Example 1, and then, 10 g of polystyrene or polycaprolactone (having a molecular weight of about 2000) was added to the reaction mixture. Then, the reaction mixture was stirred for 10 minutes under atmospheric pressure and reaction was conducted for 8 hours under reduced pressure. The intrinsic viscosity of the obtained polymer was 1.92 when polystyrene was used or 1.97 when polycaprolactone was used.

When the results of examples are compared with the results of the comparative examples, it is seen that according to the present invention, it is possible to prepare a polyester having a high molecular weight, that has been considered unobtainable by the conventional techniques, by the melt polymerization.

EXAMPLE 11

175 parts by weight of dimethyl terephthalate, 23 parts by weight of α,ω-decane-dicarboxylic acid, 130 parts by weight of ethylene glycol and 0.14 part by weight of titanium tetrabutoxide were reacted under normal pressure to distill off methanol and water until the internal temperature reached 240° C. Thereafter, the polymerization reaction was carried out under a reduced pressure, at 260° C. for 2 hours to obtain a prepolymer having an intrinsic viscosity of 0.90.

The prepolymer was converted into chips of a diameter of 2 mm and a length of 2 mm. 10 parts by weight of the chips was charged into a cylindrical reactor together with 170 parts by weight of powdered sodium sulfate of a particle size of not more than 200 mesh in such a state that the chips were not contacted with each other, and reaction was carried out under a pressure of 40 Pa, at 260° C. for 6 hours. The formed polymer was then withdrawn. The intrinsic viscosity of the polymer measured as in Example 1 was 2.06.

EXAMPLE 12

35 parts by weight of dimethyl terephthalate, 20 parts by weight of ethylene glycol and 0.022 parts by weight of calcium acetate monohydrate were subjected to transesterification reaction until the internal temperature reached 240° C. Then, 0.024 part by weight of 50% aqueous phosphorous acid solution and 4.6 parts by weight of α,ω-decane-dicarboxylic acid were added, the mixture was stirred for 10 minutes, 0.025 part by weight of titanium tetrabutoxide was added, and the mixture was reacted at 240° C. for 30 minutes while removing water. The obtained reaction product was further reacted at 275° C. for 6 hours while gradually reducing the pressure to a final reduced pressure of 70 Pa to obtain a polyester of an intrinsic viscosity of 1.04.

The polyester was ejected into water to obtain a plate of a width of 50 mm and a thickness of 2 mm. The plate was dried at 140° C. for 6 hours and placed onto a heated plate having a surface temperature of 265° C. and composed of a stainless steel plate of a 3 mm thickness having a polytetrafluoroethylene plate of a 1 mm thickness plated thereon. The heated plate was placed into a reduced pressure vessel, and reaction was carried out under 40 Pa for 90 minutes while maintaining the temperature to 265° C. The pressure was increased to normal pressure with nitrogen, and the plate was withdrawn into water to be cooled. The obtained polymer had an nitrinsic viscosity of 2.31 as measured at 35° C. in O-chlorophenol.

We claim:

1. A process for preparing a high-molecular weight polyester comprising polymerizing a polyester obtained from a dicarboxylic acid component composed mainly of an aromatic dicarboxylic acid and/or an ester-forming derivative thereof and a glycol component composed mainly of ethylene glycol and/or an ester forming derivative thereof and having an intrinsic viscosity of at least 0.8, at a temperature above the melting point of the polyester and under a reduced pressure, in the presence of a compound (A) successively generating a substance which is gaseous under the polymerization conditions and does not substantially reduce the molecular weight of the polyester, to form a polyester having an intrinsic viscosity of at least 1.0.

2. A process according to claim 1, wherein the aromatic dicarboxylic acid is selected from terephthalic acid, isophthalic acid, naphthalene-dicarboxylic acid, diphenyldicarboxylic acid and diphenyletherdicarboxylic acid.

3. A process according to claim 2, wherein the aromatic dicarboxylic acid is terephthalic acid.

4. A process according to claim 1, wherein the compound (A) is a polyester obtained from an aliphatic dicarboxylic acid having 6 to 20 carbon atoms and an aliphatic diol.

5. A process according to claim 4, wherein the compound (A) generates a cyclic ester.

6. A process according to claim 4, wherein the aliphatic diol is ethylene glycol.

7. A process according to claim 4, wherein the compound (A) is added in an amount of 2 to 20 mol % as the aliphatic dicarboxylic acid units.

8. A process according to claim 1, wherein the compound (A) is a polymer of an aliphatic hydroxycarboxylic acid having 5 to 12 carbon atoms.

9. A process according to claim 8, wherein the compound (A) is added in an amount of 2 to 20 mol % as the aliphatic hydroxycarboxylic acid units.

10. A process according to claim 1, wherein the compound (A) is polystyrene or polyoxymethylene.

11. A process according to claim 10, wherein the compound (A) is added in an amount of 2 to 20% by weight.

12. A process according to claim 1, wherein the polymerization is carried out at a temperature of 240 to 270° C.

13. A process according to claim 1, wherein the polymerization was carried out under a pressure of lower than 200 Pa.

14. A process according to claim 13, wherein the pressure is lower than 100 Pa.

15. A process according to claim 1, wherein the polymerization is carried out in the presence of a catalyst composed of a titanium compound or tin compound.

16. A process according to claim 1, wherein the polymerization is carried out by using the polyester in a granular state wherein the polymer granules are substantially covered by a powder material.

17. A process according to claim 1, wherein the polymerization is carried out by placing the polyester onto a plate to a thickness of 0.1 to 10 mm and heating the polyester on the plate.

* * * * *